UNITED STATES PATENT OFFICE.

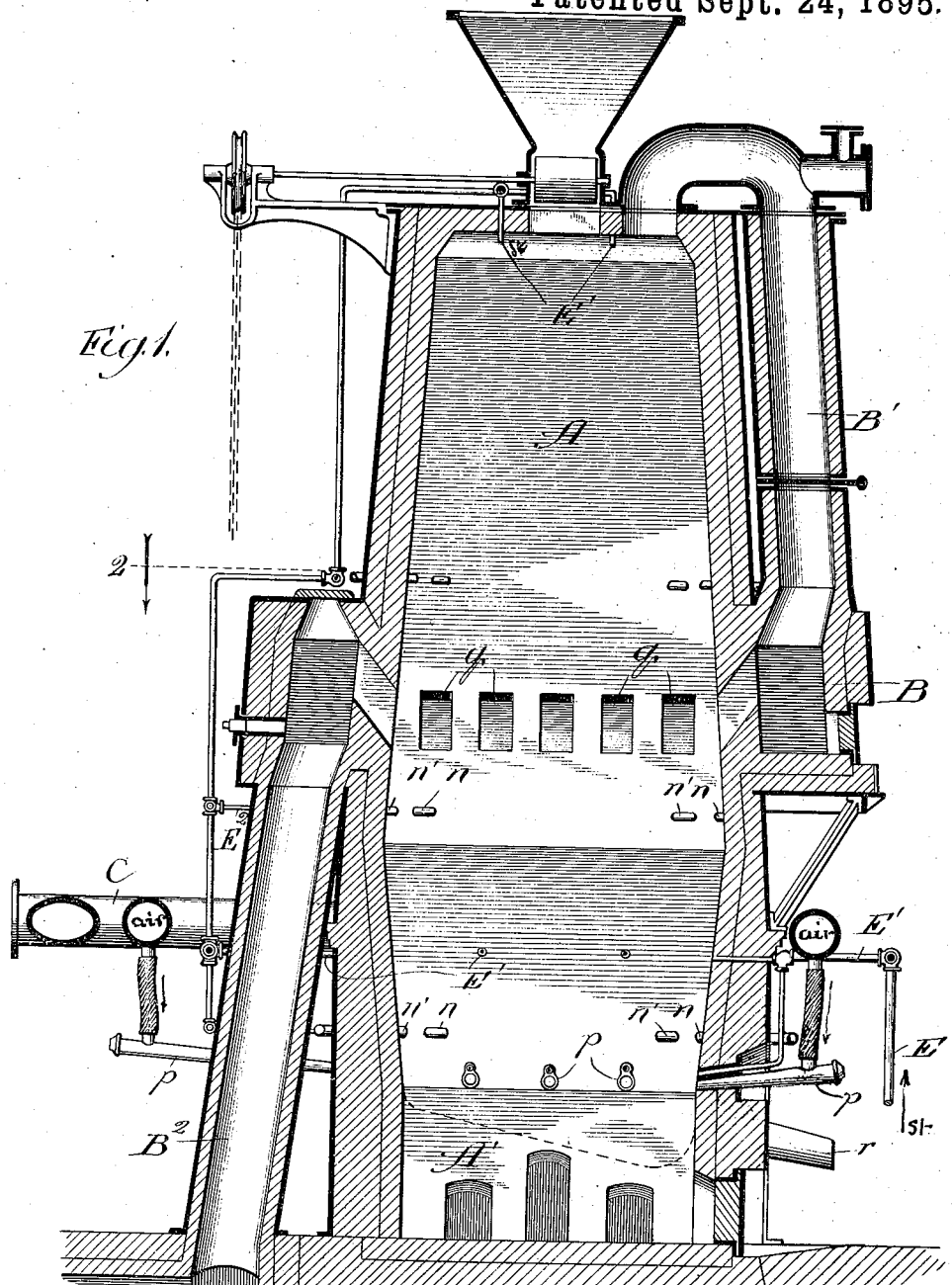

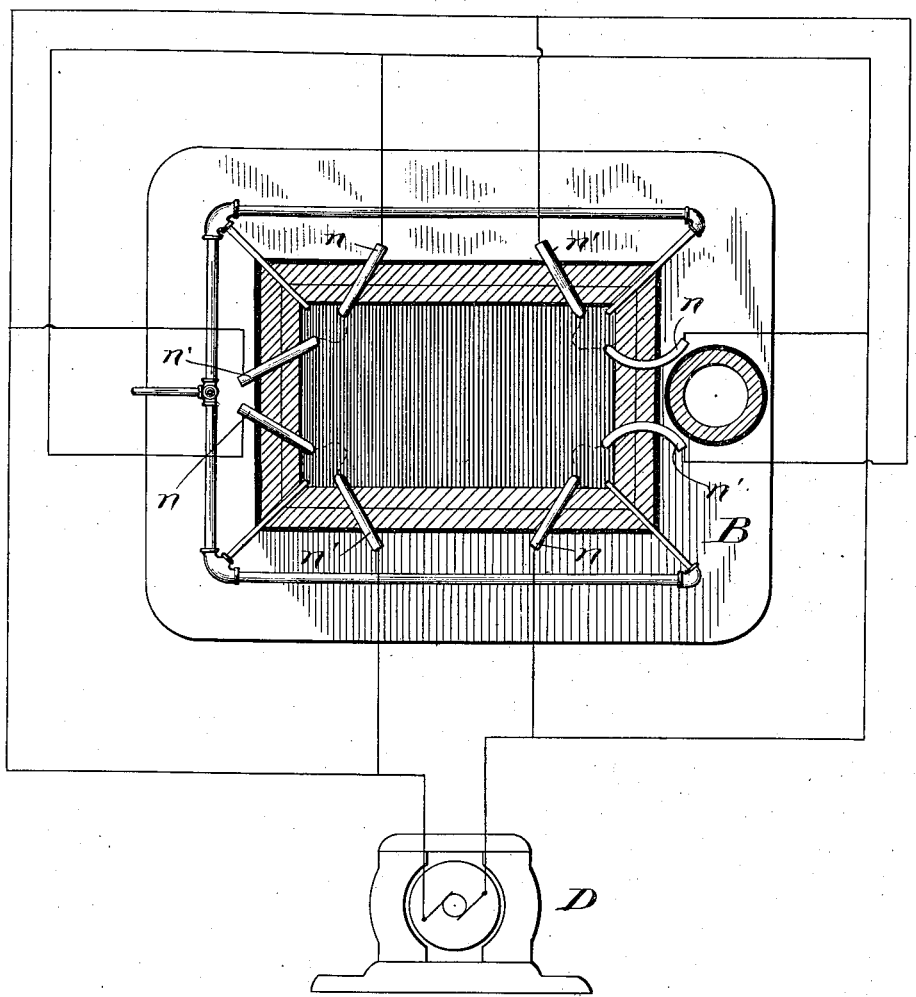

WILLIAM A. KONEMAN, OF CHICAGO, ILLINOIS.

PROCESS OF AND APPARATUS FOR MANUFACTURE OF GAS.

SPECIFICATION forming part of Letters Patent No. 546,702, dated September 24, 1895.

Application filed May 8, 1894. Serial No. 510,539. (No model.)

*To all whom it may concern:*

Be it known that I, WILLIAM A. KONEMAN, a citizen of the United States, residing at Chicago, in the county of Cook and State of Illinois, have invented a new and useful Improvement in Gas-Manufacturing Processes and Apparatus, of which the following is a specification.

My invention relates to an improvement in the art of manufacturing gas for illuminating or fuel purposes, wherein a bed of carbonaceous fuel is raised to a condition of incandescence to adapt it to decompose water-vapor or steam injected into it into its elements.

Owing to the fact that the steam in decomposing absorbs from the incandescent bed of fuel as many heat-units as its hydrogen element gives off under combustion, less the number of heat-units supplied by the combustion of oxygen to carbonic oxide, the heat of the fuel-bed is rapidly reduced to an extent which requires that it be periodically blasted with air to raise it to incandescence. This not only interrupts the gas-making operation and renders necessary, to provide a continuous generation of gas, the provision of two furnaces or producers to be alternately prepared by air-blasting and consequent raising of the fuel-beds to incandescence, but the fuel contained in the gas-generator (usually coke or hard coal) is in practice sacrificed to the extent of nearly 50 per cent. on account of the necessity of raising the fuel back to a high state of incandescence periodically, and this loss occurs in spite of the fact that the nitrogen-containing gas generated at such periods may be utilized for heating the gas-fixing and steam-superheating chambers.

My object is to provide for rendering the gas-generating operation continuous by dispensing with the necessity of periodically raising the fuel-bed to incandescence, and thereby also to produce a gas which is practically free from nitrogen.

My further object is to convert all the contained coal into a high-grade gas.

To accomplish my object I employ the electric arc by projecting it into the bed of fuel for supplying the heat continuously to the bed of fuel, and after it has once been blasted to a condition of incandescence, maintaining it in that condition by compensating for the heat-units which are abstracted from it by the decomposition of steam.

An apparatus suitable for my purpose is illustrated in the accompanying drawings, in which—

Figure 1 is a view in vertical sectional elevation of a gas-generator provided with my invention, and Fig. 2 is a section of the same taken at the line 2 on Fig. 1 and viewed in the direction of the arrow and showing my improvement by a representation in the nature of a diagram.

The generator selected for illustrating my invention involves the same general construction as that illustrated in my Letters Patent No. 520,687 for a gas-making apparatus, dated May 29, 1894, the difference being one of form—that is to say, the present apparatus is shown generally rectangular in cross-section, the better to adapt it for the application of the electrodes, while the other is more elliptical in cross-section. I do not, however, limit my invention to any particular construction of apparatus for producing gas according to the proceeding referred to, as it is applicable to all such.

A is the generator-chamber of considerable height to contain a high column of carbonaceous fuel. The chamber is shown to taper somewhat both upward and downward from near its transverse center, the lower taper extending to a point short of the base, from which the walls are straight and form a pit for ashes, though I also provide a spout $r$ for drawing off liquid slag formed with the ashes if a flux be fed with the fuel.

About the exterior of the chamber A, near and above its center, is formed a gas confining and mixing chamber B, communicating through ports $q$ with the generating-chamber, from the upper end of which a connecting-passage B' leads to the chamber B. Within the chamber B, and flanking the communication therewith of the passage B', are walls (not shown) which obstruct the flow through that chamber of the gas of distillation from the top of the fuel-chamber, thereby forcing it to pass through the lower incandescent portion of the fuel-bed to reach the ultimate outlet, shown as a downtake $B^2$, leading from the chamber it at the side of the generator opposite that at which the passage $B'$ is provided.

The main supply of the steam to be decomposed is directed into the chamber A at its upper portion through branches $E'$ of a steam-pipe E leading from the source of steam (not shown); and for initially raising the bed of fuel to the desired extent, to incandescence, tuyeres $p$ are shown leading from an air-pipe $c$, which communicates with a blast-fan. (Not shown.)

At different elevations on the structure I provide, preferably at each of the four corners, arc-producing electrodes or carbons $n$ and $n'$, of a generator D, which should be an alternating-current dynamo to equalize the consumption of the carbons. The electrodes, which may be ordinary carbons or of other suiable material, are set to extend horizontally in the walls of the structure in relative positions to produce the arc, which is projected into the chamber A by any suitable means, that shown for the purpose being a branch steam-pipe $E^2$, extending through the angle of each corner of the structure between the plane of the ends of the adjacent electrodes protruding into the chamber A to project, toward the center, the arc formed between them.

Any suitable or well-known means may be provided for automatically feeding the carbons as they become consumed—such, for example, as are used for the same purpose in connection with arc lamps.

To start the apparatus, after a fire has been made in the chamber A and the desired quantity of coal has been introduced, the bed of fuel is blasted with air from the tuyeres $p$ to incandescence, after which the air-blast is shut off and discontinued throughout the entire operation. Then steam is injected at the branch pipes $E'$ and $E^2$ simultaneously, and the electric arcs are produced between the carbons $n$ $n'$ by the dynamo D, and the heat of the electric arcs, projected by the jets of steam from the branch pipes $E^2$, maintains the fuel-bed in a state of incandescence, notwithstanding the abstraction therefrom of heat by the steam in decomposing.

During the operation liquid hydrocarbon may be injected into the chamber A by any suitable or well-known means. (Not shown.)

With the structure of apparatus shown the gas of distillation from the top of the chamber A may pass down through the passage $B'$ into the semicircumferential chamber B, then through the incandescent fuel, and enter the downtake $B^2$, with the gas generated in the lower incandescent portion of the fuel-bed, and which enters the circumferential chamber through the ports $q$.

What I claim as new, and desire to secure by Letters Patent, is—

1. In the manufacture of gas by injecting steam into a bed of incandescent carbonaceous fuel in a generator, the process of maintaining the incandescent condition of the fuel against the heat-absorbing effect of the steam in decomposing, which consists in maintaining the fuel under subjection to the heat of the electric arc and projecting the arc into the bed of fuel, substantially as described.

2. In the manufacture of gas by injecting steam into a bed of incandescent carbonaceous fuel in a generator, the process of maintaining the incandescent condition of the fuel against the heat-absorbing effect of the steam in decomposing, which consists in maintaining the fuel under subjection to the heat of the electric arc and injecting steam against the arc to project it into the bed of fuel, substantially as described.

3. In combination with a gas-generator, an electric-current generator having arc-forming electrode-terminals projecting into the chamber of the gas-generator, and a steam-jet directed against said arc to project it into the fuel-bed, substantially as and for the purpose set forth.

4. In combination with a gas-generator, an electric-current generator having arc-forming electrode-terminals projecting into the chamber of the gas-generator at different points about its circumference and in sets on different planes, and steam-jets directed against said arcs to project them into the fuel-bed, substantially as and for the purpose set forth.

WILLIAM A. KONEMAN.

In presence of—
M. J. FROST,
W. U. WILLIAMS.